(12) United States Patent
Dick et al.

(10) Patent No.: US 12,204,545 B1
(45) Date of Patent: Jan. 21, 2025

(54) SYSTEM AND METHOD FOR ELECTRONIC DOCUMENT PARSING

(71) Applicant: XSQRD, INC., Dallas, TX (US)

(72) Inventors: Jeremy Dick, Dallas, TX (US); Matthew Fruge, Dallas, TX (US)

(73) Assignee: XSQRD, INC., Dallas, TX (US)

( * ) Notice: Subject to any disclaimer, the term of this patent is extended or adjusted under 35 U.S.C. 154(b) by 0 days.

(21) Appl. No.: 17/887,417

(22) Filed: Aug. 13, 2022

Related U.S. Application Data

(60) Provisional application No. 63/233,200, filed on Aug. 13, 2021.

(51) Int. Cl.
*G06F 16/2455* (2019.01)

(52) U.S. Cl.
CPC .............................. *G06F 16/24553* (2019.01)

(58) Field of Classification Search
CPC ........... G06F 16/24553; G06F 16/2455; G06F 16/245; G06F 16/24; G06F 16/20
See application file for complete search history.

(56) References Cited

U.S. PATENT DOCUMENTS

| | | | |
|---|---|---|---|
| 9,785,830 B2* | 10/2017 | Hausmann | G06V 30/414 |
| 10,209,956 B2* | 2/2019 | Fletcher | G06F 7/10 |
| 10,354,000 B2* | 7/2019 | Wilczek | G06F 40/174 |
| 10,540,321 B2* | 1/2020 | Miller | G06F 11/30 |
| 10,547,695 B2* | 1/2020 | Maheshwari | H04L 41/082 |
| 10,706,236 B1* | 7/2020 | Platt | G06F 16/3344 |
| 10,831,798 B2* | 11/2020 | Christianson | G06F 16/3329 |
| 11,562,588 B2* | 1/2023 | Florencio | G06V 30/19147 |
| 2008/0243872 A1* | 10/2008 | Maida-Smith | H04L 63/20 707/999.102 |
| 2014/0207631 A1* | 7/2014 | Fisher | G06V 30/412 382/229 |
| 2016/0105334 A1* | 4/2016 | Boe | H04L 63/0227 707/601 |
| 2020/0019555 A1* | 1/2020 | Ramani | G06Q 10/00 |
| 2021/0151192 A1* | 5/2021 | Lucas | G06Q 40/08 |

\* cited by examiner

*Primary Examiner* — Miranda Le
(74) *Attorney, Agent, or Firm* — Cognition IP, P.C.; Edward Steakley; Schiller Hill

(57) ABSTRACT

The systems and methods described herein provide for the parsing and evaluation of electronic documents. The electronic documents may be converted to a plurality of arrays, and these arrays may be parsed and split to generate structured data objects. The structured data objects may each be associated with a section of the electronic document. Sections may be identified by evaluating the array of text by comparing the delimited data of the array to one or more keyword lists of predetermined regular expressions.

20 Claims, 13 Drawing Sheets

ROOF ← 200A

| DESCRIPTION | QUANTITY | UNIT PRICE | TAX | RCV | DEPREC. | ACV |
|---|---|---|---|---|---|---|
| 1. Tear off composition shingles (no haul off) | 35.10 SQ | 29.80 | 0.00 | 1,045.98 | (0.00) | 1,045.98 |
| 2. Roofing felt - 15 lb | 35.89 SQ | 27.98 | 10.81 | 1,004.17 | (80.59) | 923.58 |
| 3. Drip edge | 291.27 LF | 2.13 | 12.78 | 632.36 | (180.67) | 451.69 |
| 4. Laminated - comp. shingle rfg. - w/out felt | 38.87 SQ | 193.78 | 289.82 | 7,820.28 | (2,393.08) | 5,186.20 |

This line item includes a single material allowance of $86.81 per square, which reflects current market prices in your area. Market prices were verified by Materials Supply Warehouse, LLC. The MSW Managed Material Program allows you or your contractor of choice to have materials delivered directly to your home for installation. For more information on MSW contact them at: deliveryusa@materialssupplywarehousellc.com or 888-888-8888.

| 5. Flashing - rain diverter | 1.00 EA | 39.41 | 0.82 | 38.23 | (10.35) | 25.88 |
| 6. Flashing - pipe jack - lead | 5.00 EA | 66.73 | 15.77 | 344.52 | (98.44) | 246.08 |
| 7. Prime & paint roof vent | 3.00 EA | 54.80 | 2.58 | 170.58 | (117.72) | 58.86 |
| lead flashings only | | | | | | |
| 8. Roof vent - turbine type | 3.00 EA | 109.33 | 16.18 | 344.18 | (98.33) | 245.85 |
| 9. Exhaust cap - through roof - 6" to 8" | 1.00 EA | 78.25 | 2.83 | 81.07 | (23.17) | 57.90 |
| 10. Furnace vent - rain cap and storm collar, 6" | 1.00 EA | 56.65 | 1.65 | 58.30 | (23.32) | 34.98 |
| 11. Furnace vent - rain cap and storm collar, 8" | 1.00 EA | 62.88 | 2.16 | 65.04 | (26.01) | 39.03 |
| 12. Digital satellite system - Detach & reset | 1.00 EA | 31.17 | 0.00 | 31.17 | (0.00) | 31.17 |
| 13. R&R Flue cap | 1.00 EA | 120.35 | 7.15 | 127.50 | (62.97) | 64.53 |
| Attached via spring system, not secured into the concrete or mortar. | | | | | | |
| Totals: ROOF | | | 360.52 | 11,726.58 | 3,736.66 | 7,989.70 |

FRONT ELEVATION ← 200B

| DESCRIPTION | QUANTITY | UNIT PRICE | TAX | RCV | DEPREC. | ACV |
|---|---|---|---|---|---|---|
| 14. R&R Gutter / downspout - plastic | 16.00 LF | 3.86 | 1.44 | 59.04 | (18.42) | 31.62 |
| The above line item relates to damaged downspouts on this elevation. | | | | | | |
| 15. Gutter / downspout - Detach & reset | 32.00 LF | 3.43 | 0.00 | 109.76 | (0.00) | 109.76 |
| The above line item relates to detaching and resetting the gutters on this elevation, plastic | | | | | | |
| Totals: FRONT ELEVATION | | | 1.44 | 159.80 | 18.42 | 141.38 |

FIG. 2A

```
var groupNames = [
        "Apartment", "Apartment 1", "Apartment 2", "Apartment 3", "Area", "Atrium", "Attic",
        "Barn", "Basement", "Bathroom", "Bathroom (1 1/2)", "Bathroom (3/4)", "Bathroom
(full)", "Bathroom (half)", "Bedroom", "Bedroom 1", "Bedroom 2", "Bedroom 3", "Breakfast
Area/Room", "Breeze way", "Building", "Building 1", "Building 2", "Building 3",
        "Cafeteria", "Carport", "Ceiling", "Cellar", "Cleaning", "Closet", "Computer Area/
Room", "Conference Room", "Crawlspace",
        "Debris Removal", "Deck", "Dining Room", "Display Room", "Doors", "Dwelling
Roof",
        "Electrical", "Entry/Foyer", "Equipment", "Exam Room", "Exterior", "Exterior/
General",
        "Family Room", "Fencing", "Finish Items", "First Floor", "Floor", "Floor Coverings",
"Foyer/Entry", "Framing", "Front Elevation",
        "Gable", "Game Room", "Garage", "Gazebo", "Great Room", "Greenhouse", "Guest
Room",
        "Hallway", "Heat, Vent, & Cool", "Hobby Area/Room",
        "Interior",
        "Kitchen",
        "Laundry Room", "Left Elevation", "Library", "Linen Closet", "Living Room",
"Lobby", "Location 1", "Location 2", "Location 3", "Lot/Property",
        "Masonry", "Master Bath", "Master Bedroom", "Media Room", "Meeting Room",
"Mill/Trim Work", "Miscellaneous", "Mud Room",
        "Nook", "Nursery",
        "Office", "Other",
        "Painting", "Pantry", "Patio", "Personal Property", "Play Area/Room", "Plumbing",
"Pool Area", "Pool Enclosure", "Porch",
        "Rear Elevation", "Recreation Room", "Right Elevation", "Roof", "Roof Inspection",
"Roofing", "Room",
        "Sales Room", "Sauna", "Screened Lanai", "Screened Porch", "Second Floor", "Shed",
"Shop", "Show Room", "Siding", "Site Work", "Slab/Foundation", "Stairway", "Storage Area/
Room", "Study", "Sunroom",
        "Temporary Repairs", "Third Floor",
        "Unit 1", "Unit 2", "Unit 3", "Utility Room",
        "Vanity Area/Room",
        "Walk-in Closet", "Wall", "Wallpaper/Covering", "Warehouse", "Windows", "Work
Area/Room",
];
```

FIG. 2C

Search For Found Word or Phrase in Each of The Category Lists Until it is Found.

This is the Data Type, Create Blank Object

Acme Insurance, LLC\ t\ r \ n4294 Mapleview Orive\ t \ r\ nTampa. Florida 33607\ t \ r\ n727-955-3525 (ph)\ t\ \ n\r Insured Carmella Belmont nProperty: 2793 Waldeck Stre Home: (817) 233-7159\1\r \ nFort Worth, TX 76 116\ t \ r \nHome: 2973 Waldeck S :t\ t \ r \nFort Worth. TX 76116\ t\ r\ nClaim Rep.: Robert McDonald\tE-mail: rm....onald@acmeins.com \ t\ r\ nEstimator: Gregory Foster\ Business: (956) 650-0619\ t\ r \ nPosition: Field Adjuster\l\r \ nReference:\lBusiness: (844) 962-4766\ t \ r \nCompany: Acme Insurance Company\tE-mail: ail@acmeins.com\ t\r \ nBusiness: 1506 Victoria Street Suite 502 \ t \ r \nBaton Rouge, LA 70802\ t\ r \ nClaim Number: 22269\tPolicy Number: 510170\tType of Loss: Hail \ t\ r \ nDate Contacted: 5/ 15/ 2020 \ 1\r\ nDate of Loss: 4/ 27/ 2020 \tDate Received: 5/ 14/ 2020\1\ r\ nOate Inspected: 5/ 18/ 2020\tDate Entered:\t/1 5/ 2020 5:50 PM\l\ r\ nOate Est. Completed: S/ 21 / 2020 12:25 AM\ t \ r\ nPrice List TXOFSX MAY20\ t \ r\ nRestoration / Service/ Remodel\t\ r \ nEsti ate: CARMELLA_BELMONT\t\ r\ the estimale of damage has been prepared by an independent adjuster, not the insurance company. This is an estimate of\ t\ r \ndamage only and not an offer ol settlement. This appraisal is subject to review and approval by the insurance company.\ t\ r\ nThis is n tan authorization of repair, nor is it a guarantee of payment. Any hidden or undiscovered damage should be \l\r \ nbrought to the Insurance Company's attention upon discovery and any additional work must be approved.\ t\ r\n

```
{
"Customer":{
        "type": Insured
        "Name": Carmella Belmont
        },
}
``` var customerNames=[
"Insured",
"Customer",
"Claimant",
"Client"];

var companyNames=[
"Reference",
"Company"];

var adjusterNames=[
"Estimator",
"Claim Rep."];

var contractorNames=[
"Contractor"];

var personDetails=[
"Position"];

var phoneEmailNames=[
"Home",
"Cell",
"Alternate:,
"Fax",
"Business",
"E-mail"];

Var addressNames=[
"Property·,
"Home",
"Business"];

var dateNames=[
"Date Contacted",
"Date of Loss",
"Dale Inspected",
"Date Est. Completed",
"Date Received",
"Dale Entered"];

var claimNames=[
"Claim Number",
"Policy Number",
"Type of Loss"];

SYSTEM AND METHOD FOR ELECTRONIC DOCUMENT PARSING

CROSS-REFERENCE TO RELATED APPLICATION

This application claims the benefit of U.S. Provisional Patent Application No. 63/233,200, filed Aug. 13, 2021, which is incorporated by reference herein in its entirety.

TECHNICAL FIELD

The present disclosure relates generally to electronic data parsing, extraction, validation and analysis.

BACKGROUND

Manual processing of large numbers of insurance claims is inefficient and prone to human error. Traditionally in the insurance industry, individuals would have to manually recreate the estimate a software suite used by the company, which would take a considerable amount of time for each file.

To compound the problems with manual entry of the received estimates, the format of the estimate itself may not be uniform across all submissions from the adjuster.

SUMMARY

The systems and methods described herein provide for the electronic document parsing. In one embodiment, the system may receive an electronic document, wherein the electronic document comprising one or more pages of data. The system may then generate an array of text of words for one or more pages of the electronic document. The array of text may include delimited data. The generated array of text may then be evaluated by comparing the delimited data to one or more keyword lists of predetermined regular expressions (RegEx).

In some embodiments, the system may then determine the occurrence of one or more sections (groups) of the electronic document by comparing a delimited data value of the array of text to the predetermined RegEx. Parsing may be performed, for each of the one or more determined sections, on the respective text in the section to identify data values for RegEx expressions related to the section. A determination may then be made as to whether the determined section includes a detailed line of text and identifying the number of columns and the data values for the respective columns.

In some embodiments, the system may generate a data object for each section, wherein the data object comprises the identified data values for the RegEx expressions related to the section. These generated data object may then be stored in a datastore, either locally or on a network accessible database/server.

The features and components of these embodiments will be described in further detail in the description which follows. Additional features and advantages will also be set forth in the description which follows, and in part will be implicit from the description, or may be learned by the practice of the embodiments.

BRIEF DESCRIPTION OF THE DRAWINGS

The present disclosure will become better understood from the detailed description and the drawings, wherein:

FIG. 2A is an example of an electronic document that is to be analyzed in accordance with aspects of the present disclosure.

FIG. 2C shows an example of a keyword list in accordance with aspects of the present disclosure.

FIG. 2F shows an example of an OCRed document to be parsed in accordance with aspects of the present disclosure.

DETAILED DESCRIPTION

Figure 1A:
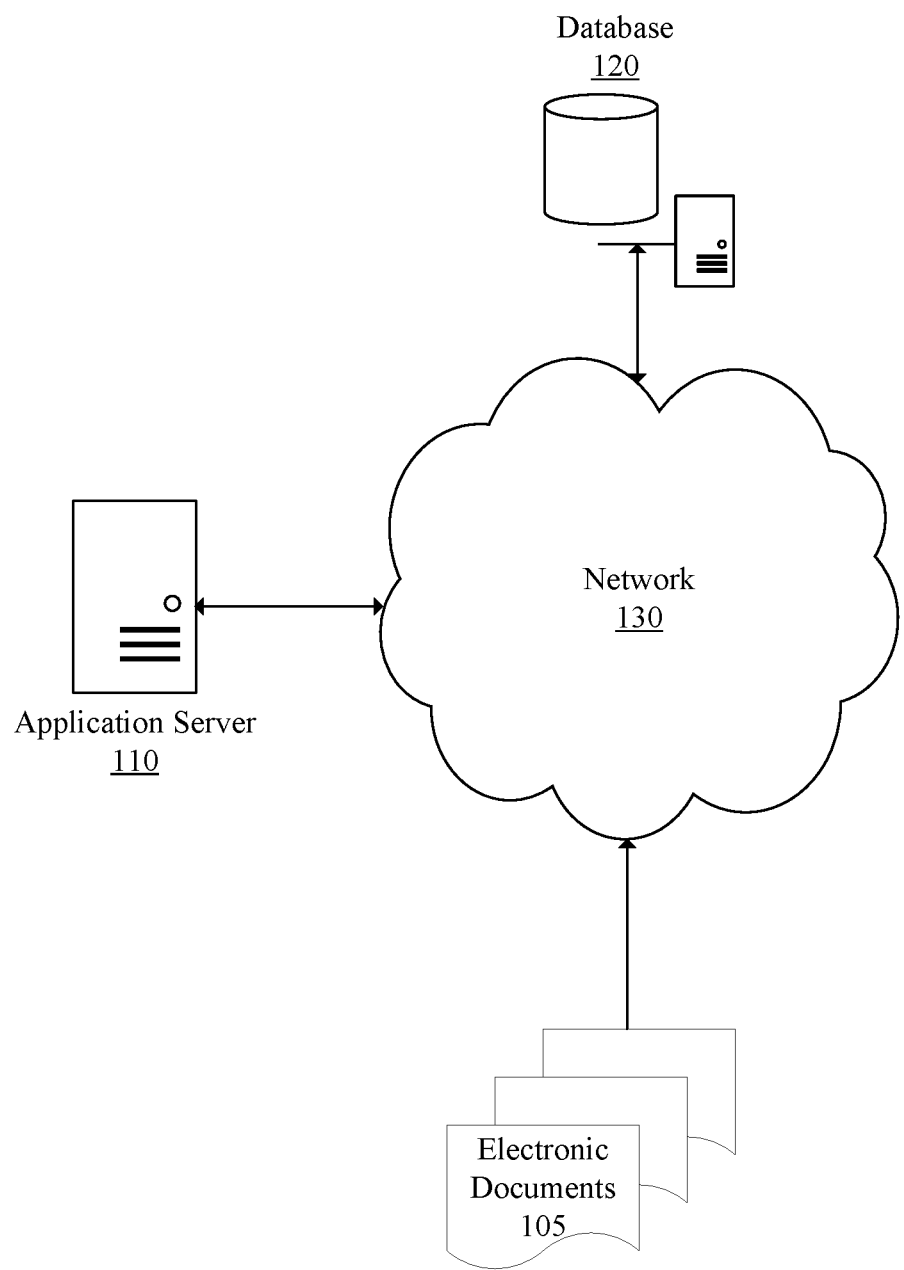
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

The following generally relates to a system and methods for parsing one or more electric documents, each comprising one or more pages. In some embodiments, the system and methods may be used to parse an insurance estimate written in one of several formats commonly used within the industry. In some embodiments, the format may not be known beforehand and a recognition process may be performed to determine the format. In some embodiments, a format may not be known or determinable, and may be processed as a generic format with generic text information. The generic information may be analyzed after the parsing and extracting to determine the information type, classification and/or category. This analysis may be the basis for generating a new format outline/profile which may be used in the recognition and parsing of future documents.

In some embodiments, Escape Sequences (T/R/N-tab, return, new line) may be used as delimiters combined with Regular Expression (RegEx) to parse the text in a document. The parsing allows for the extraction of data from the text of the page and regroup the extracted data into structured objects in a meaningful way. For example, in the first column that describes a line item, there may be 2 or 3 lines of text for a single line item. There may be additional text used to describe, summarize or explain details related to the line item. In the remaining columns for that line item, there may only be one line of text. Escape sequences may be used in the process to keep all of the lines of text grouped appropriately into one record and not create 3 separate records in the database for the additional text associated with the line item. This may be seen in FIG. 2A.

In some embodiments, a physical document may be scanned or otherwise digitized to generate an electronic document. Optical character recognition may be performed on the electronic document before the system reads and analyzes said electronic document. The first page of an electronic document may be a title page or cover sheet, and may provide information related to the document, the creators of the document, the entity for whom the documents was create, the type or class of document, the purpose of the document or combination thereof. The first page may be evaluated to determine the occurrence of one or more section (groups). Each of the sections may have a data object generated to contain data values identified within the section.

In some embodiments, one or more arrays of text of words may be generated from the electronic document. The generated arrays may include delimited data from which comparisons can be made with predetermined lists of RegEx. The generated arrays may be parsed to extract one or more data values associated with the section's data object. The parsing may be accomplished by splitting the arrays at the T/R/N delimiters (creating strings), then performing a regex search on each string. In some embodiments, the creating and splitting of arrays may be iterated over until an escape syntaxed string of text on each page is encountered.

In some embodiments, when the system is used to parse insurance estimates, once the output is created, users may then use the data from the insurance estimate to import into their CRM for use in job management. They will be able to derive the labor, materials, and profitability of the estimate, as prescribed by the insurance carrier and determine if it meets their thresholds or if it needs revisions. In some embodiments, the system may learn, after a sufficient number of electronic documents have been processed and analyzed, to determine what potential revisions are needed based off of line item patterns seen in previous estimates. This data may also be combined with 3d and CAD models to label parts of the model with the actual estimate line items, furthering the revision automation part of the process. For example, if a contractor makes a floorplan sketch of a room and comes up with different dimensions than those used in the insurance carriers estimate, he could automatically create a revised estimate using the same line items but different quantities of each.

In some embodiments, the system may be configured to identify a summary page from the one or more pages of the electronic document. The summary page may include one or more total and/or subtotal values, wherein the total and subtotal values represent a final summation of all values identified within their corresponding scope. In some embodiments, there may be a plurality of summary pages in the electronic document. The system may identify all summary pages from the electronic document and generate a string associated with each identified summary page. The system may analyze the electronic document to identify one or more strings associated with a summary page. For example, the summary pages may include the string "Summary for" within a predetermined region of the page or within a predetermined number of identified/parsed/extracted objects on the page. Each title may then be grouped into arrays corresponding to page from which it was identified. In some embodiments, the line from which the identified string belongs may be extracted in its entirety and a title name corresponding to the array. In some embodiments, if there are two identified strings on a page, both lines may be extracted and processed in a similar way to that above with the exception that the second identified string is labeled and named as a subtitle.

In some embodiments, the summary totals themselves may be presented in key/value pairs. These key/value pairs may be on the same line of the document. In some embodiments, the key/value pairs may be offset from one another. For example, all values may be shifted by the same amount with relation to the keys. This may happen if the document is scanned at an angle. In other instances, one or more values may be misaligned from their keys while the remaining key/value pairs are unaffected. The system may be configured to identify the shifting of the key/value pairs and extract the correct value from the line corresponding to key's value.

In some embodiments, the system may be configured to identify all the elements for each summary page and extract "Summary Totals" from the structured information. Each of the identified elements may then be grouped into arrays based on the horizontal coordinates of the element. In some embodiments, each line below the summary title may then be read and searched for key/value pairs that contain the Summary Totals' title and its value. The data extracted may then be saved and added to the existing scope as the Summary Totals.

In some embodiments, the system may include a data validation interface. The data validation interface may be accessed by a user after the processing of an electronic document. In some embodiments, data validation may be performed on a document by document basis or as a batch of document. Batches of documents may be grouped based on similarities between the documents. Similarities may include format of the document, source of the document, destination of the document, or combination thereof. In some embodiments, the data validation interface may be configured to allow the user to check and verify that the interpreted information is correct.

FIG. 1A shows a diagram illustrating an exemplary electronic document parsing environment 100 in accordance with aspects of the currently disclosed invention. The electronic document parsing environment 100 may comprise one or more electronic documents 105, an application server 110, a database 120 and a network 130.

Application server 110 and database 120 may communicate with one another over network 130. Application server 110 may be any computing device capable of performing the function of this disclosure. Database 120 may be any storage device capable of storing data related to the processing and analyzing of the electronic documents and any data generated during the processing of the electronic documents. The database 120 may be a separate device or the same device as application server 110. The database 120 may be located in the same location as that of application server 110, or at separate locations.

Figure 1B:
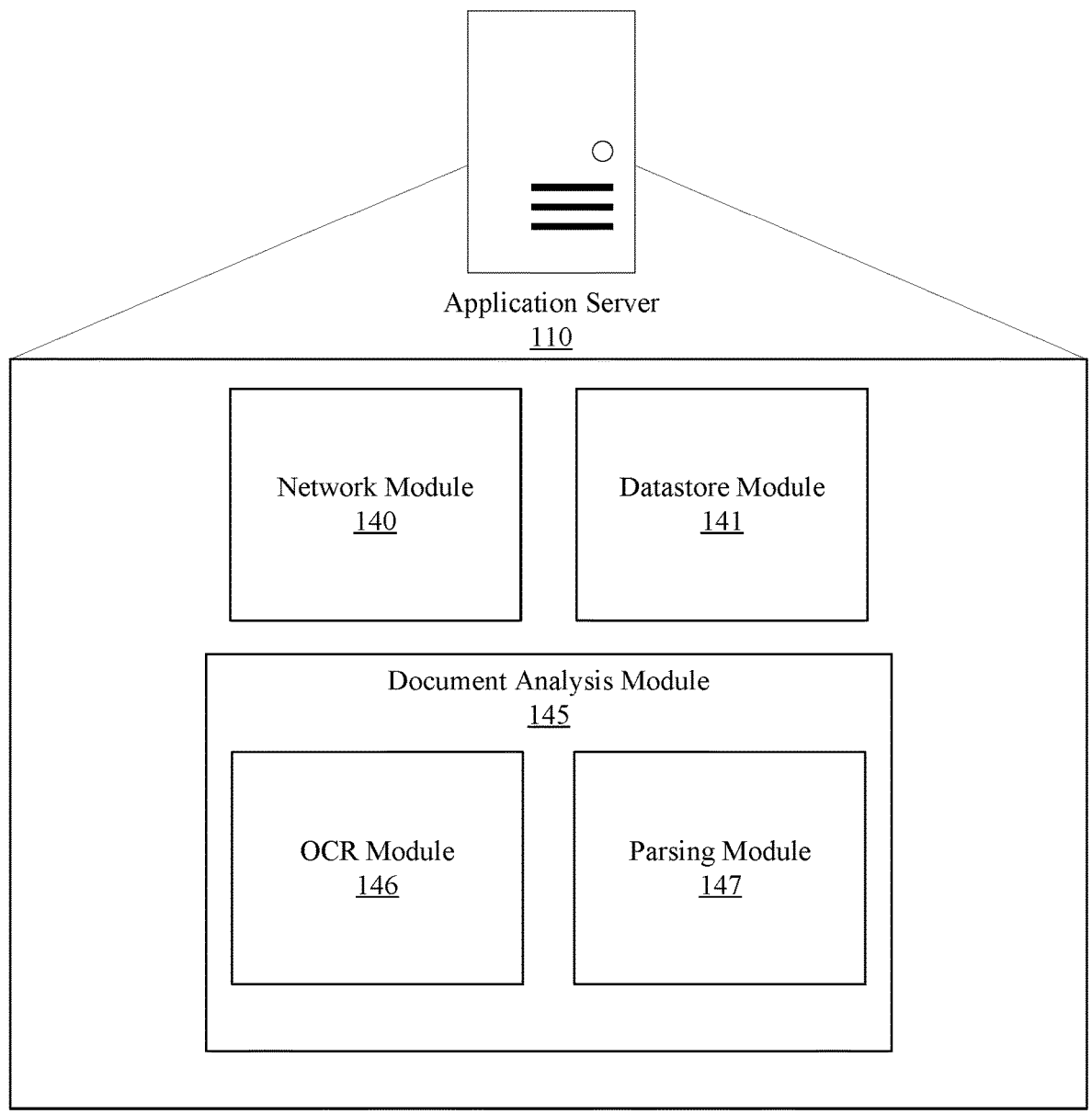
FIG. 1B is a diagram illustrating an exemplary application server in accordance with aspects of the present disclosure.

FIG. 1B is a diagram illustrating an exemplary application server 110. Application server 110 may comprise a network module 140, a datastore module 141 and a document analysis module 145.

Network module 140 may transmit and receive network signals and receive signals from other computing systems via a network. In some examples, the network module 140 may enable transmitting and receiving signals from the Internet. Signals received by the network module 140 may be used by the other modules. The modules may transmit signals through the network module 140.

Datastore module 141 may be configured to store one or more electronic documents, arrays associated or generated from the one or more electronic documents and structured data generated from the parsing and evaluation of the electronic documents and generated arrays. The datastore module 141 may receive and transmit the stored information/data from the document analysis module 145, database 120 or other internal or external modules.

Document analysis module 145 may comprise an OCR module 146 and a parsing module 147. The OCR module 146 may receive scanned or otherwise captured digitized images of physical documents and generate a textual electronic document. Parsing module 147 may generate array of text from the pages of the OCRed electronic document. The array of text may then be parsed to identify sections of the electronic document, and data associated with the identified sections.

FIG. 2A shows an example of a document to be parsed in accordance with some embodiments of the disclosed invention. An electronic document may be one or more pages and may be parsed in sequentially, in parallel, asynchronously or combination thereof. The electronic document may comprise one or more group names 200A and 200B, a plurality of column headers 201A-201G. There may be any number of column headers, but only seven are being shown in the example on FIG. 2A. There may be one or more line items 202 with data from each of the line items corresponding to each of the column headers. A line item note 203 may also be included as one or more additional lines of text below the row of the line item 202 the note belongs to.

In some embodiments, an array of text may be generated from the electronic document. The array may be split into line item rows at predetermined delimiters. Each of the rows may then be further split into an array individual objects at a second predetermined delimiter. The number of objects may then be compared to the number of column headers. If the number of objects and the number of column headers are the same, each object in the row array may then be stored as a value corresponding to the column which is at the same array position as the object. If the number of objects is less than the number of column headers, an alternate predetermined delimiter used to split the row further. The alternate predetermined delimiter may be compared to each object in the row array, starting at the last element in the row array. The comparison may iterate through all the objects in the row array in a decreasing order until the delimiter is found, and the object split at the index of the object. The objects in the array between the index of the split and the end of the array may be incremented by one to increase the overall length and increment the number of objects in the row array. This may be performed until the number of objects is equal to that of the number of column headers.

Figure 2B:
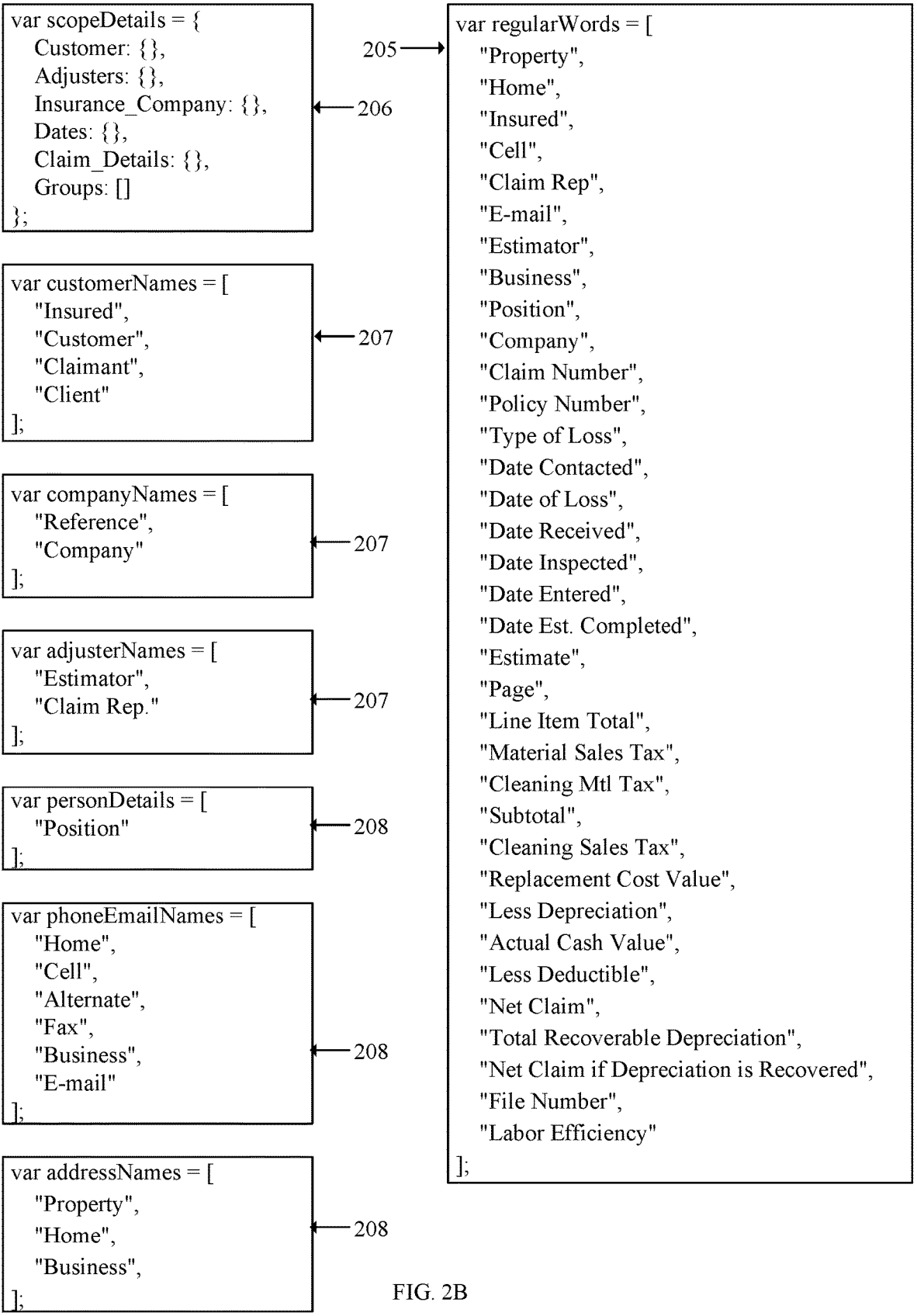
FIG. 2B shows examples of keyword lists in accordance with aspects of the present disclosure.

FIGS. 2B and 2C shows examples of keyword lists in accordance with aspects of the present disclosure. A top level data object 206 may be a structured data object which comprises one or more data values associated with extracted data from the array of text. Each of the data values may be identified from the array of text by comparing the parsed array of text with a RegEx list corresponding to a specified type of data. There may a regular words RegEx list 205, section level RegEx list 207 and a data level RegEx list 208. Each of the RegEx lists may be used to identify and extract data from the array of text associated with a desired data or object type.

Figure 2D:
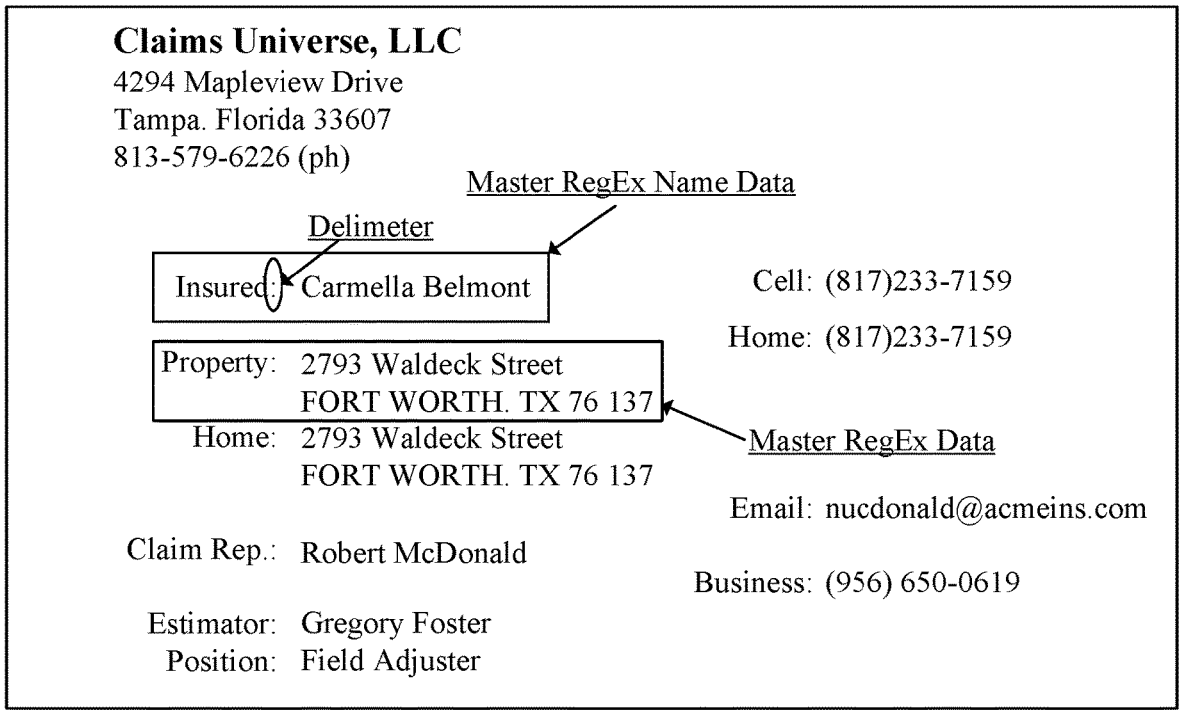
FIG. 2D shows an example of an electronic document that is to be OCRed and parsed in accordance with aspects of the present disclosure.

FIG. 2D shows an example of an electronic document that is to be OCRed and parsed in accordance with aspects of the present disclosure.

Figure 2E:
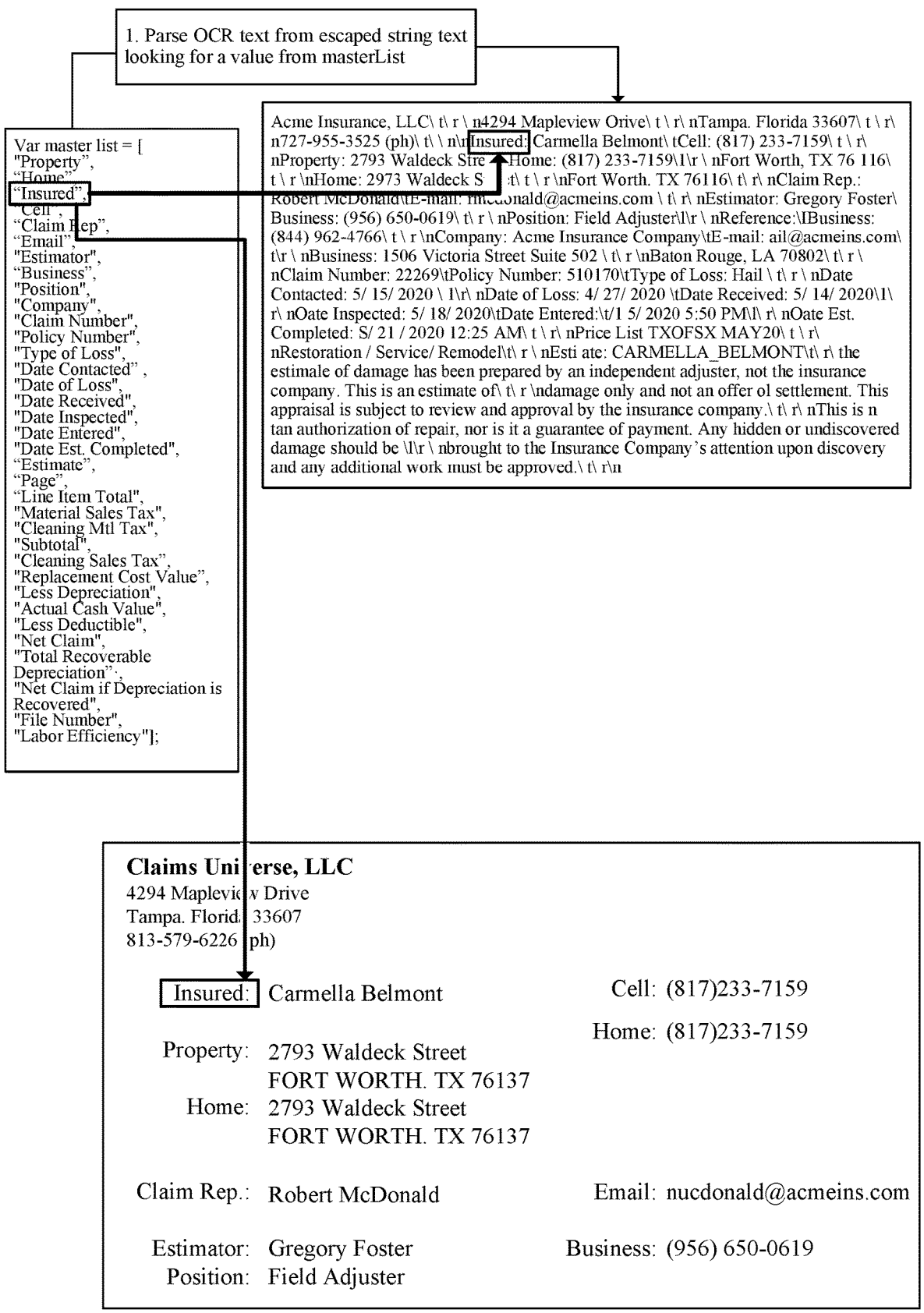
FIG. 2E shows an example of an OCRed document to be parsed in accordance with aspects of the present disclosure.

FIG. 2E shows an example of an OCRed document to be parsed in accordance with aspects of the present disclosure.

FIG. 2F shows an example of an OCRed document to be parsed in accordance with aspects of the present disclosure.

Figure 3A:
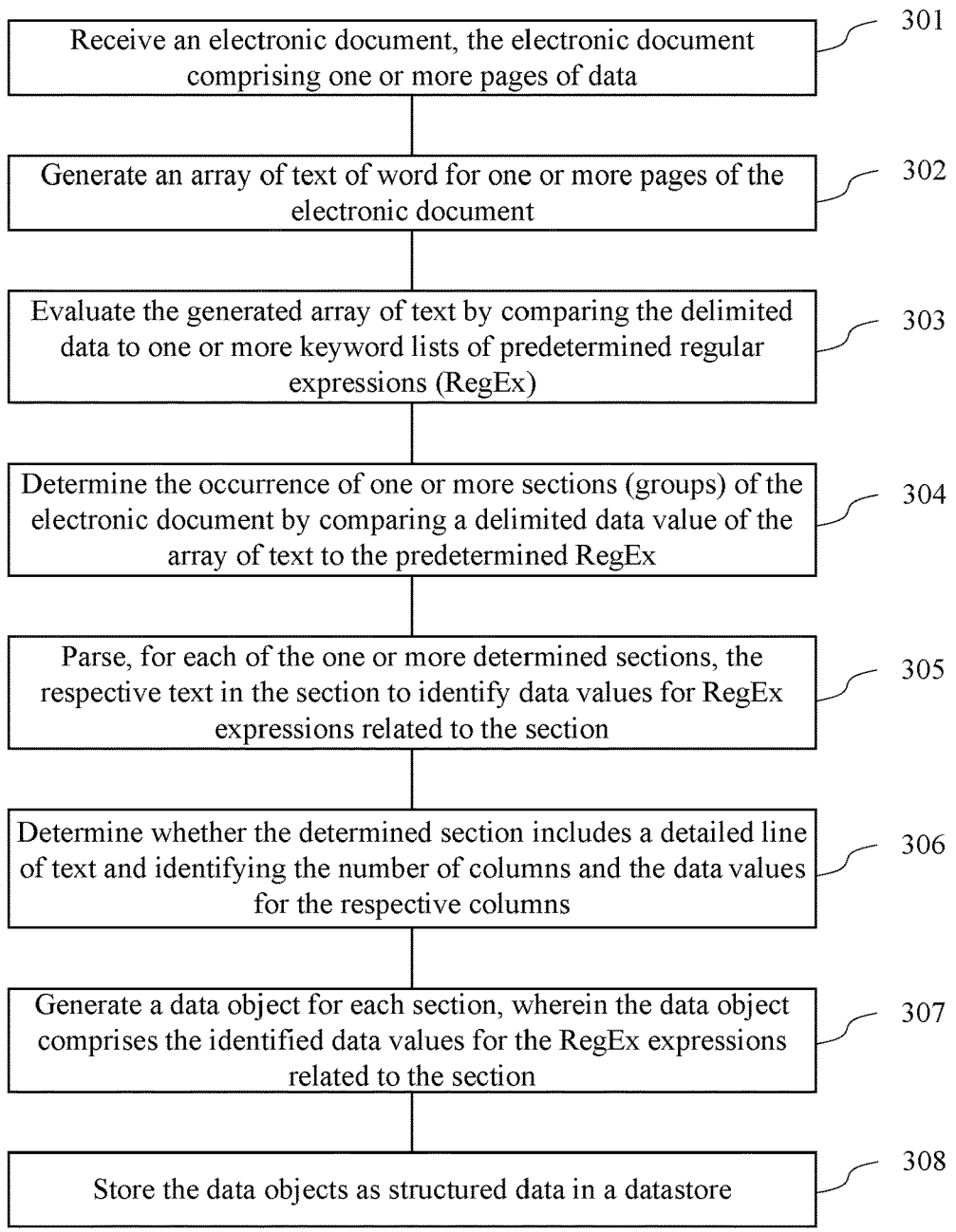
FIG. 3A shows an exemplary method for analyzing and evaluating electronic documents in accordance with aspects of the present disclosure.

FIG. 3A is a flow chart illustrating an exemplary method 300 that may be performed in accordance with some embodiments.

At step 301, the system is configured to receive an electronic document, the electronic document comprising one or more pages of data.

At step 302, the system is configured to Generate an array of text of word for one or more pages of the electronic document.

at step 303, the system is configured to evaluate the generated array of text by comparing the delimited data to one or more keyword lists of predetermined regular expressions (RegEx).

At step 304, the system is configured to determine the occurrence of one or more sections (groups) of the electronic document by comparing a delimited data value of the array of text to the predetermined RegEx.

At step 305, the system is configured to parse, for each of the one or more determined sections, the respective text in the section to identify data values for RegEx expressions related to the section.

At step 306, the system is configured to determine whether the determined section includes a detailed line of text and identifying the number of columns and the data values for the respective columns.

At step 307, the system is configured to generate a data object for each section, wherein the data object comprises the identified data values for the RegEx expressions related to the section.

At step 308, the system is configured to store the data objects as structured data in a datastore.

Figure 3B:
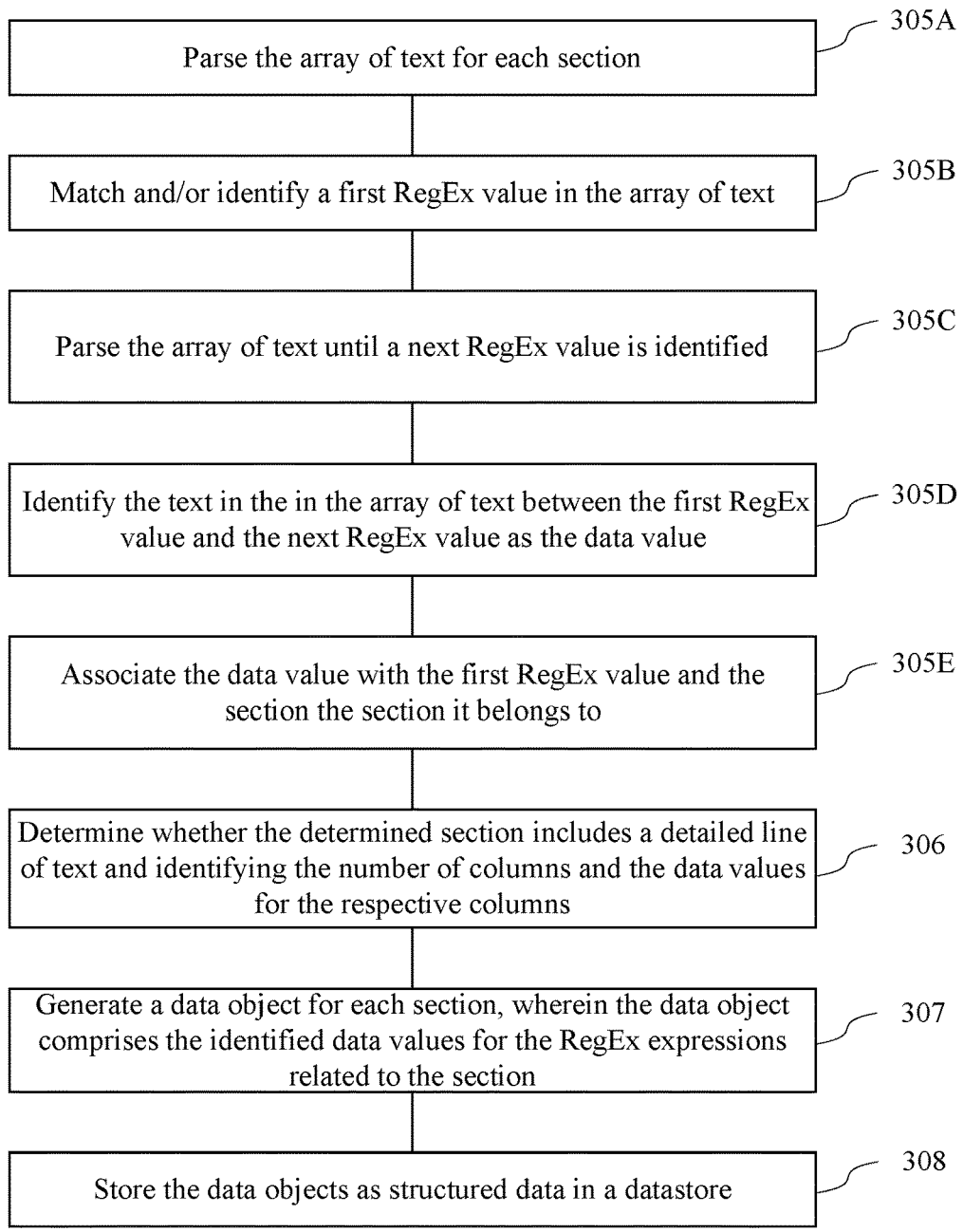
FIG. 3B shows an exemplary method for analyzing and evaluating electronic documents in accordance with aspects of the present disclosure.

FIG. 3B is a flow chart illustrating an exemplary method 300 that may be performed in accordance with some embodiments.

At step 305A, the system is configured to parse the array of text for each section.

At step 305B, the system is configured to match and/or identify a first RegEx value in the array of text.

At step 305C, the system is configured to parse the array of text until a next RegEx value is identified.

At step 305D, the system is configured to identify the text in the in the array of text between the first RegEx value and the next RegEx value as the data value.

At step 305E, the system is configured to associate the data value with the first RegEx value and the section the section it belongs to.

At step 306, the system is configured to determine whether the determined section includes a detailed line of text and identifying the number of columns and the data values for the respective columns.

At step 307, the system is configured to generate a data object for each section, wherein the data object comprises the identified data values for the RegEx expressions related to the section.

At step 308, the system is configured to store the data objects as structured data in a datastore.

Figure 3C:
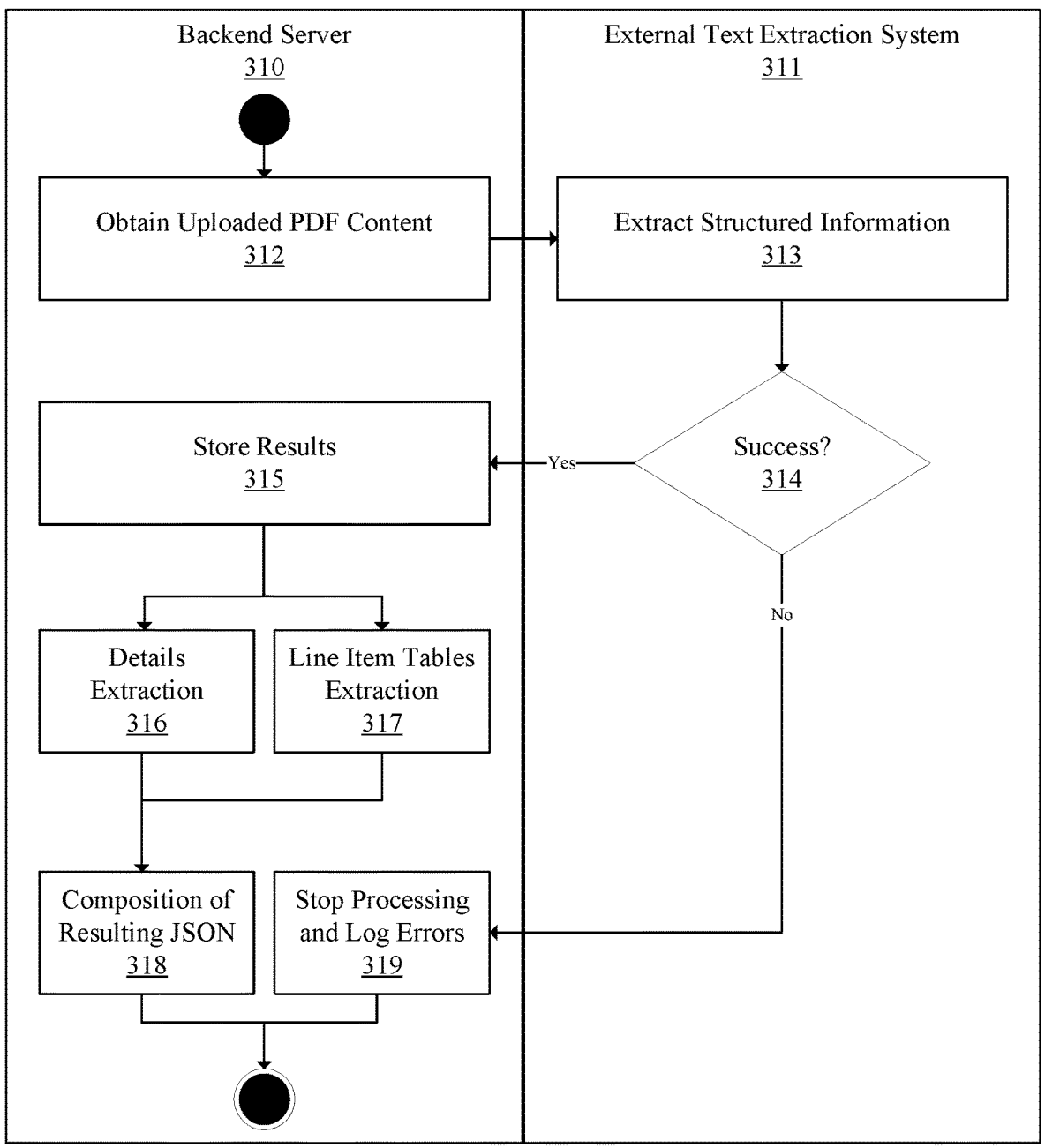
FIG. 3C shows an exemplary method for analyzing and evaluating electronic documents in accordance with aspects of the present disclosure.

FIG. 3C shows an exemplary method for analyzing and evaluating electronic documents in accordance with aspects of the present disclosure. In some embodiments, the method may include steps executed on a backend server 310 and an external text extraction system 311.

At step 312, the system is configured to obtain uploaded pdf content.

At step 313, the system is configured to extract structured information.

At step 314, the system is configured to determine if the extraction of structured information has been successful. If the extraction has been successful, the method proceeds to step 315. If the extraction fails, the method proceeds to step 319.

At step 315, the system is configured to store results of the extraction process.

At step 316, the system is configured to extract details from the stored results.

At step 317, the system is configured to extract line item tables from the stored results.

At step 318, the system is configured to compose a JSON object based on the extracted details and the extracted line item tables. In some embodiments, the system may be configured to compose one or more data structures to store the extracted details and extracted line item tables.

At step 319, the system is configured to stop processing and log one or more errors received during the structured information extraction of step 313.

Figure 3D:
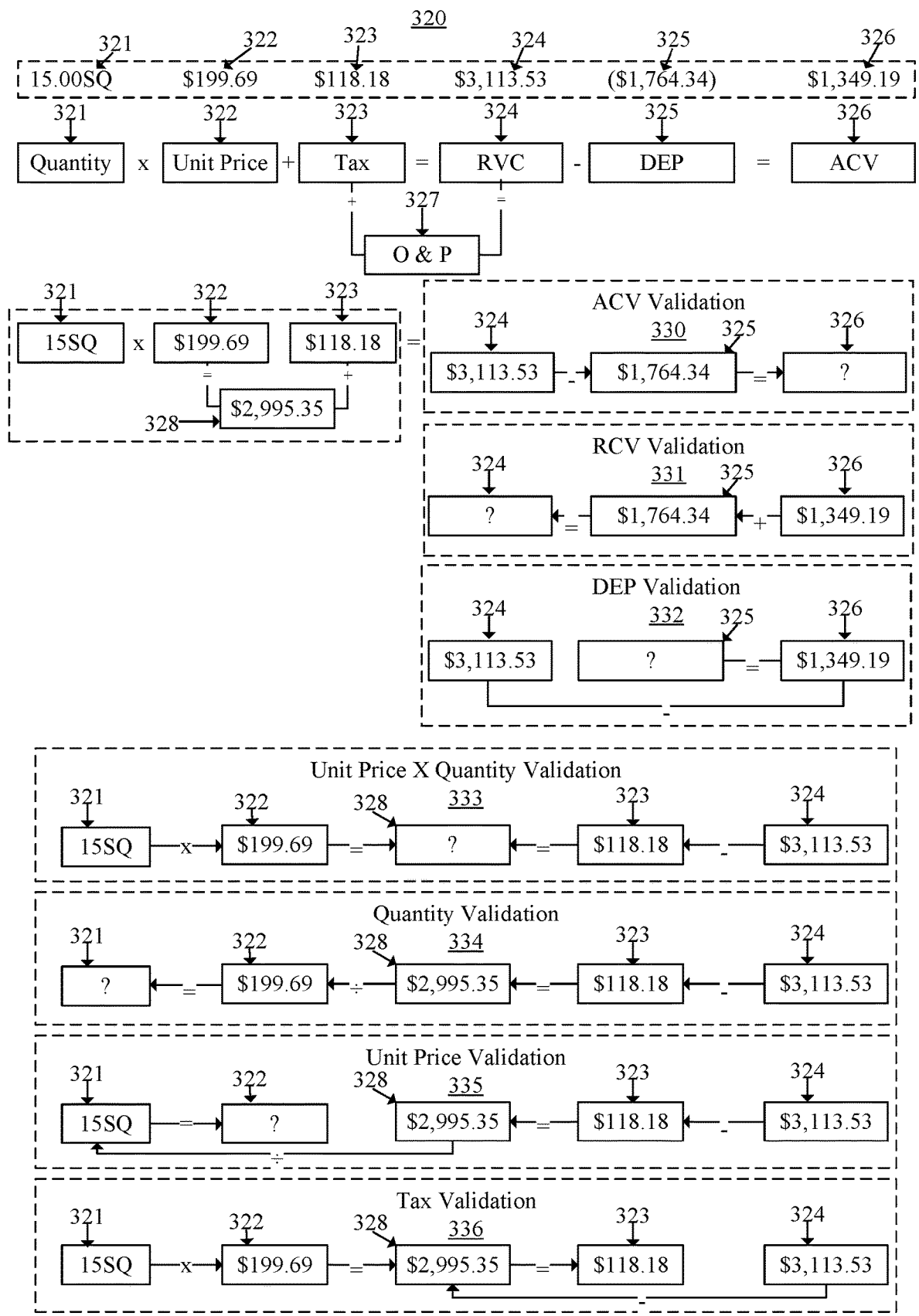
FIG. 3D shows an exemplary method for line item data validation in accordance with aspects of the present disclosure.

FIG. 3D shows an exemplary line item data validation process 320 in accordance with aspects of the present disclosure. The line item data validation process may be configured to validate one or more line items. In some embodiments, each line of a summary page may include columns for quantity 321, unit price 322, tax 323, Replacement cost value (RVC) 324, depreciation (DEP) 325, actual cash value (ACV) 326 and overhead and profit (O & P) 327. In some embodiments, intermediate values or subtotals 328 may be calculated during the validation process. In some embodiments, the validation process may include ACV validation 330, RCV validation 331, DEP validation 332, unit price X quantity validation 333, quantity validation 334, unit price validation 335 and tax validation 336. In some embodiments, each line item may be passed through one or more processes to test the validity of each column. The process for confirming these values is shown in FIG. 3D. In some embodiments, after this check is done, a boolean flag may attached to each checked line item. The flag may be set to "true" if the item's columns are consistent with the validation calculations shown in FIG. 3D. The boolean flag may be set to "false" if the columns do not add up. For each invalid item, the user may be provided with an input field in each column for the user to edit the value. In some embodiments, a suggested value for the column that caused the validation failure may be displayed to the user. The user may choose the suggested value or input their own value. After each change the user inputs or chooses, the validation and suggestion process may be repeated across the entire scope. When a group or section has all its items valid, the system may then compare the computed sum of its items to its extracted totals. In some embodiments, the totals may also have boolean flags attached for tracking validity. After all groups and/or sections have been validated, their computed totals may then be checked against the extracted summary totals. Each summary total may have a boolean flag attached to help the user tell which one is invalid. In some embodiments, the system may be configured to provide functionality for items, groups and sections to be created to balance the numbers until the scope is valid and all numbers add up. A scope is valid when all boolean flags are checked as true.

In some embodiments, the suggestion or suggested value to correct a validation error may be generated by one or more machine learning models. The one or more machine learning models may be trained on one or more datasets, wherein the datasets include a plurality of validated line items, line items that failed validation and user entered corrected values for the line items that failed validation.

In some embodiments, the machine learning models may include decision trees such as classification trees, regression trees, boosted trees, bootstrap aggregated decision trees, random forests, rotation forests or a combination thereof. Additionally or alternatively, machine learning models may include neural networks such as, artificial neural networks (ANN), autoencoders, probabilistic neural networks (PNN), time delay neural networks (TDNN), convolutional neural networks (CNN), deep stacking networks (DSN), radial basis function networks (RBFN), general regression neural networks (GRNN), deep belief networks (DBN), deep neural networks (DNN), deep reinforcement learning (DRL), recurrent neural networks (RNN), fully recurrent neural networks (FRNN), Hopfield networks, Boltzmann machines, deep Boltzmann machines, self-organizing maps (SOM), learning vector quantizations (LVQ), simple recurrent networks (SRN), reservoir computing, echo state networks (ESN), long short-term memory networks (LSTM), bi-directional RNNs, hierarchical RNNs, stochastic neural networks, genetic scale models, committee of machines (COM), associative neural networks (ASNN), instantaneously trained neural networks (ITNN), spiking neural networks (SNN), regulatory feedback networks, neocognitron networks, compound hierarchical-deep models, deep predictive coding networks (DPCN), multilayer kernel machines (MKM), cascade correlation networks (CCN), neuro-fuzzy networks, compositional pattern-producing networks, one-shot associative memory models, hierarchical temporal memory (HTM) models, holographic associative memory (HAM), neural Turing machines, or combination thereof.

Figure 4:
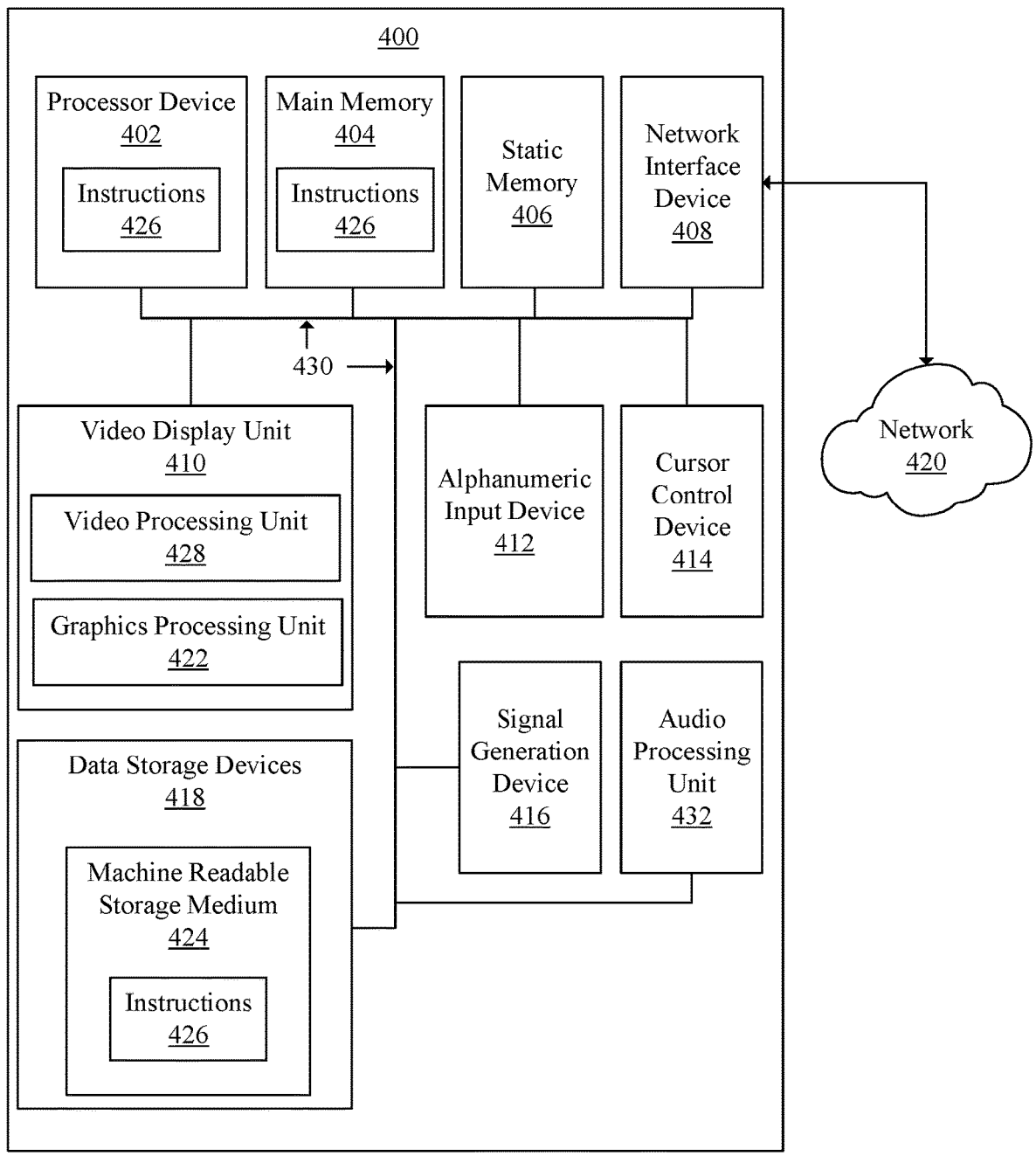
FIG. 4 is a diagram illustrating an exemplary computer that may perform processing in some embodiments and in accordance with aspects of the present disclosure.

FIG. 4 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein.

The computer system 400 may further include a network interface device 408 to communicate over the network 420. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), a graphics processing unit 422, a signal generation device 416 (e.g., a speaker), graphics processing unit 422, video processing unit 428, and audio processing unit 432.

The data storage device 418 may include a machine-readable storage medium 424 (also known as a computer-readable medium) on which is stored one or more sets of instructions or software 426 embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting machine-readable storage media.

In one implementation, the instructions 426 include instructions to implement functionality corresponding to the components of a device to perform the disclosure herein. While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-method for electronic document parsing, the method comprising:

receiving, at a server, an electronic document, the electronic document comprising one or more pages of data, the electronic document including a first grouping of data comprising: a first group name, a first row of column headers and multiple rows of line item data having numeric values corresponding to the first row of multiple column headers, and the electronic document including a second grouping of line item data comprising: a second group name, a second row of multiple column headers and multiple rows of line item data having numeric values corresponding to the second row of multiple column headers;

generating an array of text of words for one or more pages of the electronic document, the array of text including delimited data comprising each of the line item numeric values of the first grouping of data and each of the line item numeric values of the second grouping of data;

evaluating the generated array of text by comparing the delimited data to a plurality of keyword lists of predetermined regular expressions (RegEx), the plurality of keyword lists including a first keyword listing comprising multiple predefined words indicating a section and a second keyword listing comprising multiple defined words indicating a type of data;

determining the occurrence of one or more sections of the electronic document by comparing a delimited data value of the array of text to the predetermined RegEx of the first keyword listing, wherein the first group name and the second group name each correspond to a predetermined RegEx value of the keyword listing comprising the multiple predefined words indication a section;

for each of the one or more determined sections, parsing the respective text in the section to identify data values for RegEx expressions related to the section, the parsing comprising;

identifying a first RegEx value in an array of text of the one or more determined sections;

parsing the array of text until a next RegEx value is identified;

identifying text in the array of text between the first RegEx value and the next RegEx value; and associating a data value of the identified text with the first RegEx value and with the section that the data value belongs to;

determining whether the determined section includes one or more detailed lines of text and identifying a number of columns and data values for the respective columns;

performing a validation calculation of each column of line items of a summary page, the summary page including multiple columns of data values and a total value for each of the multiple columns;

associating a validation indicator to each line item where a line item's columns are consistent with validation calculations for a column, and wherein the validation indicator describes whether the line item's columns are consistent with the validation calculation;

determining the occurrence of one or more data types of the electronic document by comparing a delimited data value of the array of text to the predetermined RegEx of the second key word listing;

generating a data object for each section, wherein the data object comprises the identified data values for the RegEx expressions related to the section;

storing the data objects as structured data in a datastore; and rendering, on a display device, a multi-dimensional model of a structure wherein the multi-dimensional model includes one or more structure elements comprising the data values.

2. The computer-method of claim 1, further comprising:

splitting an array of text into line item rows at predetermined delimiters;

splitting the line item rows into an array of individual objects at another predetermined delimiter;

comparing a number of objects to a number of column headers; and if the number of objects and the number of column headers are the same, then storing each object in the row array as a value corresponding to a column which is at the same array position as the object; and if the number of objects is less than the number of column headers, using an alternate predetermined delimiter to further divide a line item row.

3. The computer-method of claim 1, wherein identifying the number of columns comprises:

splitting the array of text at predetermined delimiters to identify and create an array for each row of data;

identifying a row of multiple column headers from the array of rows; and counting a number of delimiters that separate each of the column headers; and wherein the identifying of the data values for each of the respective columns comprises: splitting the array of text for each row at each delimiter;

counting the number of objects in the array of text for each row after the splitting is performed;

comparing the number of objects in the array of text for each of the rows against the number of columns determined;

associating values stored at each object of the array of texts of the row with a corresponding column header in the same array position when the comparison determines that the number of objects is the same as the number of columns; and splitting the array of text for the row at a second predetermined delimiter until the number of objects is equal to that of the number of columns.

4. The computer-method of claim 1, further comprising: matching a RegEx value in the array of text and identifying a data value for data occurring in the array of text following the matched RegEx value.

5. The computer-method of claim 4, wherein the identifying of the data value comprises parsing through the generated array of text until a next RegEx value is found, identifying the text in the array between the matched RegEx value and the next RegEx value as the data value and associating the data value with the matched RegEx value and a section being parsed of the one or more determined sections.

6. The computer-method of claim 1, further comprising: continuing parsing through the generated array of text until a next RegEx expression in a lists of predetermined RegEx expressions is found.

7. The computer-method of claim 1, wherein the parsing through the generated array of text is performed in a predetermined order; and wherein the parsing compares the array of text against one or more keyword lists associated with a section currently being parsed from the one or more determined sections.

8. The computer-method of claim 1, wherein the RegEx expressions include a section level RegEx list for customer names comprising the RegEx expressions: Insured, Customer, Claimant and Client.

9. The computer-method of claim 1, wherein an array of text of words is generated for each page of the electronic document; and wherein each array of text is evaluated against a master list of RegEx; and skipping further processing an array if there are no matches found.

10. The computer-method of claim 1, wherein the one or more pages of data includes one or more summary pages; and
wherein the one or more summary pages include one or more line items, one or more subtotal values and a total value, the total value representing a final summation of the one or more subtotal values.

11. The computer-method of claim 10, further comprising:
generating a validation interface, wherein the validation interface is configured to display, to a user on a display device, each line item, the subtotal values and the total value;
validating each line item, wherein the validation generates a result corresponding to success or failure of the validation;
indicating, in the validation interface, the validation result for each line item;
identifying one or more line items that failed the validation; and
receiving, for each failed line item, a user input, wherein the user input resolves the validation failure for failed line item.

12. The computer-method of claim 10, further comprising:
rendering, on a display device, a three dimensional model of a structure wherein the three dimensional model includes one or more structure elements;
associating each line item with a structure element of the three multi-dimensional model; and
labeling, on the three multi-dimensional model, each structure element associated with a line item, wherein the labeling comprises a value corresponding to the line item.

13. A system comprising one or more processors, and a non-transitory computer-readable medium including one or more sequences of instructions that, when executed by the one or more processors, cause the system to perform operations comprising:

receiving, at a server, an electronic document, the electronic document comprising one or more pages of data, the electronic document including a first grouping of data comprising: a first group name, a first row of column headers and multiple rows of line item data having numeric values corresponding to the first row of multiple column headers, and the electronic document including a second grouping of line item data comprising: a second group name, a second row of multiple column headers and multiple rows of line item data having numeric values corresponding to the second row of multiple column headers;
generating an array of text of words for one or more pages of the electronic document, the array of text including delimited data comprising each of the line item numeric values of the first grouping of data and each of the line item numeric values of the second grouping of data;
evaluating the generated array of text by comparing the delimited data to a plurality of keyword lists of predetermined regular expressions (RegEx), the plurality of keyword lists including a first keyword listing comprising multiple predefined words indicating a section and a second keyword listing comprising multiple defined words indicating a type of data;
determining the occurrence of one or more sections of the electronic document by comparing a delimited data value of the array of text to the predetermined RegEx of the first keyword listing, wherein the first group name and the second group name each correspond to a predetermined RegEx value of the keyword listing comprising the multiple predefined words indication a section;
for each of the one or more determined sections, parsing the respective text in the section to identify data values for RegEx expressions related to the section, the parsing comprising;
identifying a first RegEx value in an array of text of the one or more determined sections;
parsing the array of text until a next RegEx value is identified;
identifying text in the array of text between the first RegEx value and the next RegEx value; and
associating a data value of the identified text with the first RegEx value and with the section that the data value belongs to;
determining whether the determined section includes one or more detailed lines of text and identifying a number of columns and data values for the respective columns;
performing a validation calculation of each column of line items of a summary page, the summary page including multiple columns of data values and a total value for each of the multiple columns;
associating a validation indicator to each line item where a line item's columns are consistent with validation calculations for a column, and wherein the validation indicator describes whether the line item's columns are consistent with the validation calculation;
determining the occurrence of one or more data types of the electronic document by comparing a delimited data value of the array of text to the predetermined RegEx of the second key word listing;
generating a data object for each section, wherein the data object comprises the identified data values for the RegEx expressions related to the section;
storing the data objects as structured data in a datastore; and rendering, on a display device, a multi-dimensional model of a structure wherein the multi-dimensional model includes one or more structure elements comprising the data values.

14. The system of claim 13, wherein the one or more pages of data includes one or more summary pages; and wherein the one or more summary pages include one or more line items, one or more subtotal values and a total value, the total value representing a final summation of the one or more subtotal values.

15. The system of claim 13, further comprising:

generating a validation interface, wherein the validation interface is configured to display, to a user on a display device, each line item, the subtotal values and the total value;

validating each line item, wherein the validation generates a result corresponding to success or failure of the validation;

indicating, in the validation interface, the validation result for each line item;

identifying one or more line items that failed the validation; and receiving, for each failed line item, a user input, wherein the user input resolves the validation failure for failed line item.

16. The system of claim 13, further comprising:

rendering, on a display device, a three dimensional model of a structure wherein the three dimensional model includes one or more structure elements;

associating each line item with a structure element of the three multi-dimensional model; and labeling, on the three multi-dimensional model, each structure element associated with a line item, wherein the labeling comprises a value corresponding to the line item.

17. The method of claim 1, further comprising the operations of:

determining one or more summary pages of the electronic document, and generating a string associated with each of the one or more summary pages.

18. The method of claim 1, further comprising the operations of:

determining one or more summary pages of the electronic document, and generating a string associated with each of the one or more summary pages.

19. The method of claim 1, further comprising the operations of:

determining whether the line item numeric values of the first group of data add up to a subtotal in the electronic document; and generating a validation error if the line item numeric values of the first group of data does not add up to the subtotal.

20. The method of claim 19, further comprising:

determining a replacement value for one of the line item values of the first group of data to correct the validation error.

* * * * *